United States Patent [19]

Shimoyoshi et al.

[11] Patent Number: 5,623,557
[45] Date of Patent: Apr. 22, 1997

[54] METHOD AND APPARATUS FOR DATA ENCODING AND DATA RECORDING MEDIUM

[75] Inventors: Osamu Shimoyoshi, Kanagawa; Mito Sonohara, Tokyo; Kyoya Tsutsui, Kanagawa, all of Japan

[73] Assignee: Sony Corporation, Tokyo, Japan

[21] Appl. No.: 413,395

[22] Filed: Mar. 30, 1995

[30] Foreign Application Priority Data

Apr. 1, 1994 [JP] Japan .................................. 6-064856

[51] Int. Cl.⁶ ........................................ G06K 9/00
[52] U.S. Cl. .............................. 382/246; 382/239
[58] Field of Search ............................ 382/232, 244, 382/245, 246, 247, 251, 233, 234, 235, 236, 237, 238, 239, 240, 241, 242, 243, 248; 358/433, 429, 261.1; 341/51, 67, 63, 65

[56] References Cited

U.S. PATENT DOCUMENTS

| | | | |
|---|---|---|---|
| 4,103,287 | 7/1978 | Frank | 382/246 |
| 4,441,208 | 4/1984 | Iida | 382/246 |
| 4,742,554 | 5/1988 | Tsuda | 382/246 |
| 4,797,944 | 1/1989 | Tanaka | 382/246 |
| 4,843,632 | 6/1989 | Lee et al. | 382/246 |
| 4,947,447 | 8/1990 | Miyaoka et al. | 382/246 |
| 5,109,433 | 4/1992 | Notenboom | 382/246 |
| 5,150,430 | 9/1992 | Chu | 382/246 |

FOREIGN PATENT DOCUMENTS

| | | | |
|---|---|---|---|
| 0511692A2 | 11/1992 | European Pat. Off. | G11B 20/00 |
| 0570131A1 | 11/1993 | European Pat. Off. | H04B 1/66 |
| WO88/01811 | 3/1988 | WIPO | H03M 7/00 |

Primary Examiner—Leo Boudreau
Assistant Examiner—Bijan Tadayon
Attorney, Agent, or Firm—Limbach & Limbach

[57] ABSTRACT

A data encoding method apparatus in which the volume of arithmetic-logical operations for calculating the total number of bits required for encoding for adaptive bit allocation in the variable length encoding system for expediting the processing. In the data encoding apparatus for encoding and subsequently variable length encoding the input data, spectral data obtained on orthogonal transform coding are routed to a block floating circuit 403 for normalization and re-quantized in a quantization circuit 404 depending on the bit allocation number information from a bit allocation calculating circuit 406 so as to be then variable length encoded by an encoding circuit 407 and outputted at an output terminal 408. The bit allocation circuit 406 refers to a table memory circuit 409 in which re-quantized data domain is divided at boundary points corresponding to code length transitions in order to calculate the total number of bits required for encoding using a smaller volume of arithmetic-logical operations for the purpose of adjusting the number of allocated bits.

11 Claims, 10 Drawing Sheets

METHOD AND APPARATUS FOR DATA ENCODING AND DATA RECORDING MEDIUM

BACKGROUND OF THE INVENTION

This invention relates to a method and apparatus for encoding digital signal data obtained on digitizing speech or audio signals or video signals, and a data recording medium having encoded data recorded thereon.

In compressing data at a pre-set bit rate (the number of bits per unit time) for recording or transmission, it is necessary to calculate the number of bits required for encoding before actually proceeding to encoding. The number of bits may be obtained by calculating the sum of the number of bits required for respective words.

In general audio signal compression techniques, it is determined by which number of bits or steps the respective signal components of the input signal are to be quantized, and quantization is effectuated with the number of quantization bits thus determined or with the number of quantization steps thus determined in order to encode the quantized words.

With fixed-length encoding, the number of bits required for encoding may be determined only with the number of bits or with the number of quantization steps, so that the number of bits required for encoding may be determined without effectuating the quantization.

Conversely, with variable length encoding, the number of bits required for encoding is changed depending on the value of the quantized words, even if the word has been quantized with the same number of quantization bits or the same number of quantization steps. Thus the number of bits required for encoding cannot be known unless the quantization is effectuated.

FIG. 1 is a flow chart showing the process of calculating the sum of the numbers of bits in the variable length encoding.

In FIG. 1, the number of bits Allbits required for encoding an input data string Data[i] is calculated. The number of data in the data string is Ndata. The number of bits or the number of quantization steps are assumed to be pre-set.

At step S10, the loop control variable i used for the series of operations and the variable Allbits indicating the total number of bits are initialized, that is set to zero.

At the next step S11, the ith data Data[i] is normalized, using a normalizing coefficient, in order to calculate a normalized value D. The function Normalize() executes normalization in accordance with a pre-set normalization coefficient.

At the next step S12, the normalized value is actually quantized. The function Quantize() effectuates quantization in accordance with the pre-set number of quantization bits or the pre-set number of quantization steps and returns the as-quantized values (integers).

At the next step S13, the number of bits required for encoding the quantized value Q Length[i] is found. The function LenOVal() is responsive to the as-quantized value to return the number of bits required for encoding.

At the next step S14, the number of encoding bits Length [i] of the as-quantized value Q is cumulatively added to the variable Allbits indicating the total number of bits in order to calculate the sum of the numbers of bits required for encoding.

At the next step S15, i is incremented for having reference to the next data.

At the next step S16, it is determined whether or not processing has been completed for all of the data Data[i]. If the result is YES, the program is terminated. If otherwise, the program reverts to step S11 in order to process the next data.

With the variable length encoding, since it becomes necessary to quantize the respective input data in order to calculate the total number of bits required for encoding, the quantity of the arithmetic/logical operations becomes voluminous.

SUMMARY OF THE INVENTION

In view of the foregoing, it is an object of the present invention to provide a method and apparatus for encoding digital signal data whereby the total number of bits required for encoding may be calculated with a smaller volume of arithmetic-logical operations to contribute to speedup and cost reduction by process simplification, and a data recording medium having the encoded data recorded thereon.

In one aspect, the present invention provides an encoding method and apparatus for variably length encoding encoded input data including calculating the total number of bits required for encoding using the boundary values on a data string corresponding to transitions of code length after variable length coding and code lengths in regions between the boundary values.

In another aspect, the present invention provides a data recording medium having recorded thereon encoded and subsequently variable length encoded input data wherein the data recorded thereon is such data re-quantized at the final stage of the encoding and subsequently variable length encoded in such a manner that the values of boundaries on the re-quantized data string corresponding to code length transitions is diminished.

According to the present invention, the total number of bits may be calculated using the boundary values corresponding to code length transitions without performing word-based quantization for diminishing the volume of the arithmetic-logical operations. This may be advantageously employed for adjustment of bit allocation for adaptive bit allocation for controlling the encoding so that the total number of bits of the variably encoded data is within a pre-set number of bits.

By reducing the number of the boundary points on the quantized data string corresponding to the code length transitions, it becomes possible to reduce the volume of the arithmetic-logical operations required for encoding.

Also, by quantizing input data by quantization means with positive-negative symmetry at the final stage of encoding, variable length encoding the encoded values using code lengths with positive-negative symmetry and by calculating the total number of bits required for encoding by collectively handling the quantized data of the same magnitude, or by performing the calculation using quantized data domain division corresponding to the boundary points on the quantized data string corresponding to code length transitions for calculating the total number of bits required for encoding, it becomes possible to further reduce the volume of the arithmetic-logical operations required for encoding.

DESCRIPTION OF THE PREFERRED EMBODIMENTS

Figure 1:
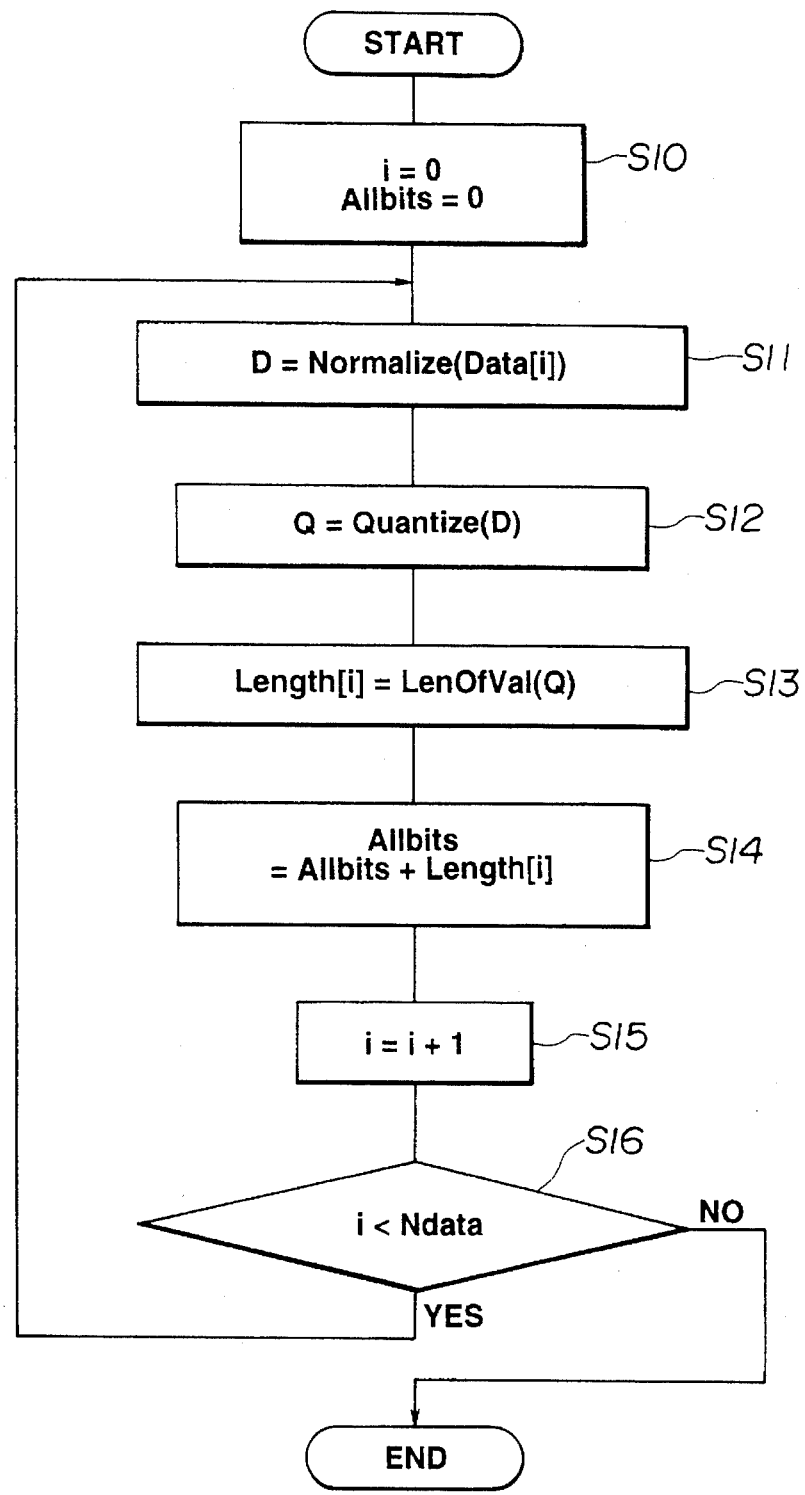
FIG. 1 is a flow chart for illustrating the process of calculating the total number of bits required for variable length encoding in the conventional practice.

Referring to the drawings, preferred illustrative embodiments of the present invention will be explained in detail.

Specifically, the technique of high efficiency encoding the input digital signal, such as an audio PCM signal, using sub-band coding (SBC), adaptive transform coding (ATC) and adaptive bit allocation, is explained by referring to FIG. 1.

Figure 2:
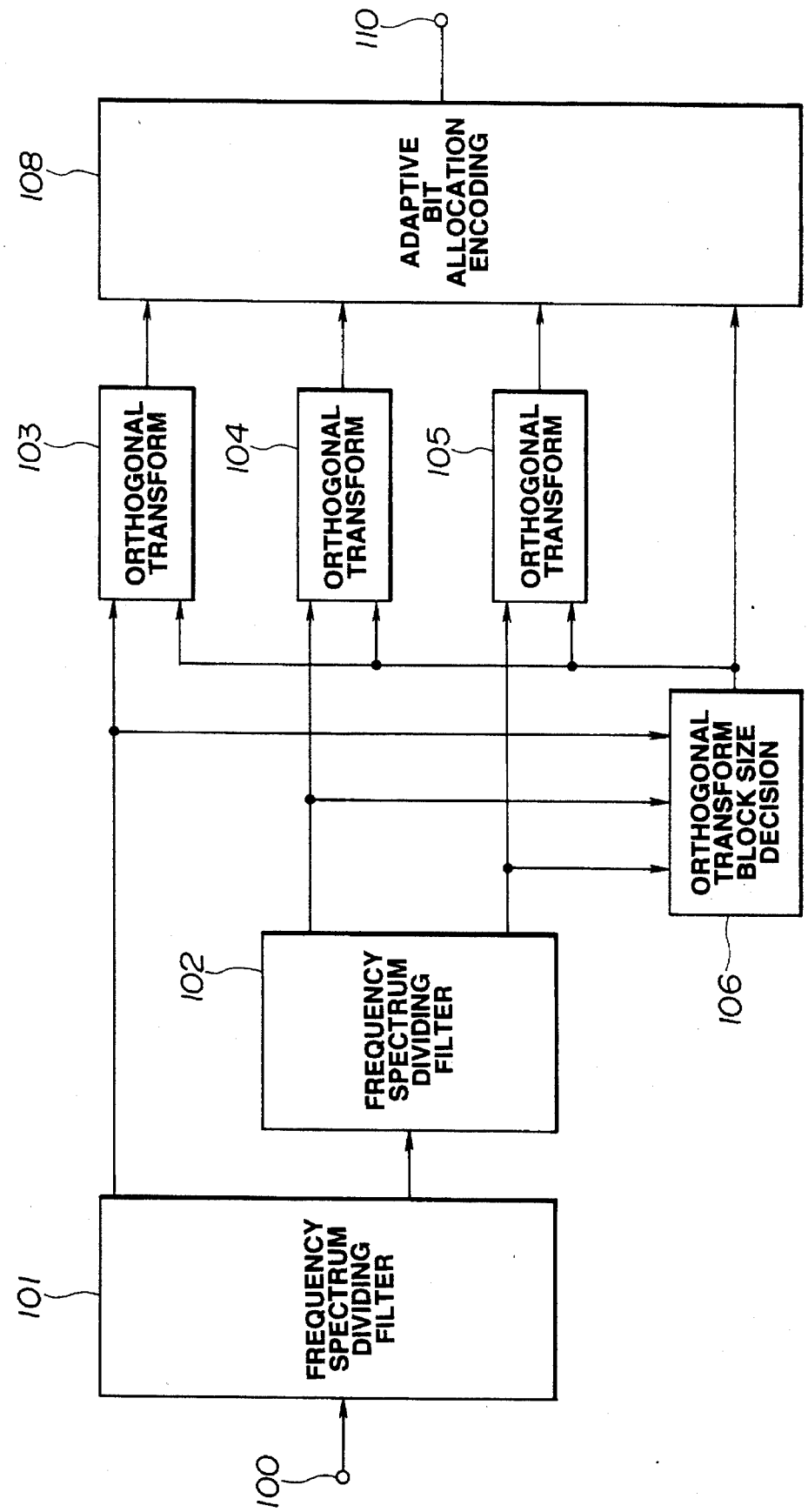
FIG. 2 is a block circuit diagram showing an embodiment of a high efficiency audio data encoding device according to the present invention.

With the illustrative high efficiency coding device, shown in FIG. 2, the input digital signal is divided into plural frequency bands, the bandwidths of which are selected so that the two lower most bands are of the same bandwidth and the bandwidth becomes wider with increase in the frequency. The input digital signal is orthogonally transformed for each of the frequency bands to produce spectral signals on the frequency axis. The resulting spectral data is encoded by adaptive bit allocation for each critical band for the low frequency range in order to take into account the psychoacoustic characteristics of the human auditory system as later explained and for sub-bands divided from the critical bands for the mid to high frequency range in order to take the block floating efficiency into account. With the embodiment shown herein, the orthogonal transform block size is adaptively changed in accordance with the input signal prior to proceeding to orthogonal transform.

Referring to FIG. 2, with the sampling frequency of, for example, 44.1 kHz, audio PCM signals of from 0 to 22 kHz are supplied to an input terminal 100. This input signal is divided by a frequency spectrum dividing filter 101, such as a QMF filter, into a band of 0 to 11 kHz and a band of 11 to 22 kHz. The signal of the band of 0 to 11 kHz is further divided by a frequency spectrum dividing filter 102, such as a QMF filter, into a band of 0 to 5.5 kHz (low range band) and a band of 5.5 to 11 kHz (mid range band). The QMF filter for dividing the input signal into plural frequency bands is discussed in, for example, R. E. Crochiere, Digital Coding of Speech in Sub-bands, 55 Bell Syst. Tech. J. No. 8 (1976). The technique of dividing a frequency spectrum into equal-width frequency ranges is discussed in Joseph H. Rothweiler, Polyphase Quadrature Filters—A New Sub-band Coding Technique, ICASSP 83 Boston.

The signals of the respective bands from the filters 101, 102 are routed to orthogonal transform circuits 103, 104 and 105. The outputs of the respective bands from the filters 101, 102 are routed to an orthogonal transform block size decision circuit 106 where the block size for each band is determined. The orthogonal block size information as determined by the orthogonal transform block size decision circuit 106 is routed to the orthogonal transform circuits 103, 104 and 105 where the filter outputs of the respective bands are blocked depending on the block sizes so as to be processed with orthogonal transform.

In the orthogonal transform block size decision circuit 106, the block size length of 11.6 msec, which is the maximum block size, is used as a basic size. If the signal is temporally quasi-stationary, the frequency resolution is increased by selecting the maximum orthogonal transform block size of 11.6 msec. If the signal is not temporally non-stationary, the orthogonal transform block size is divided into four and eight for the band lower than 11 kHz and for the band higher than 11 kHz for increasing time resolution.

Figure 3:
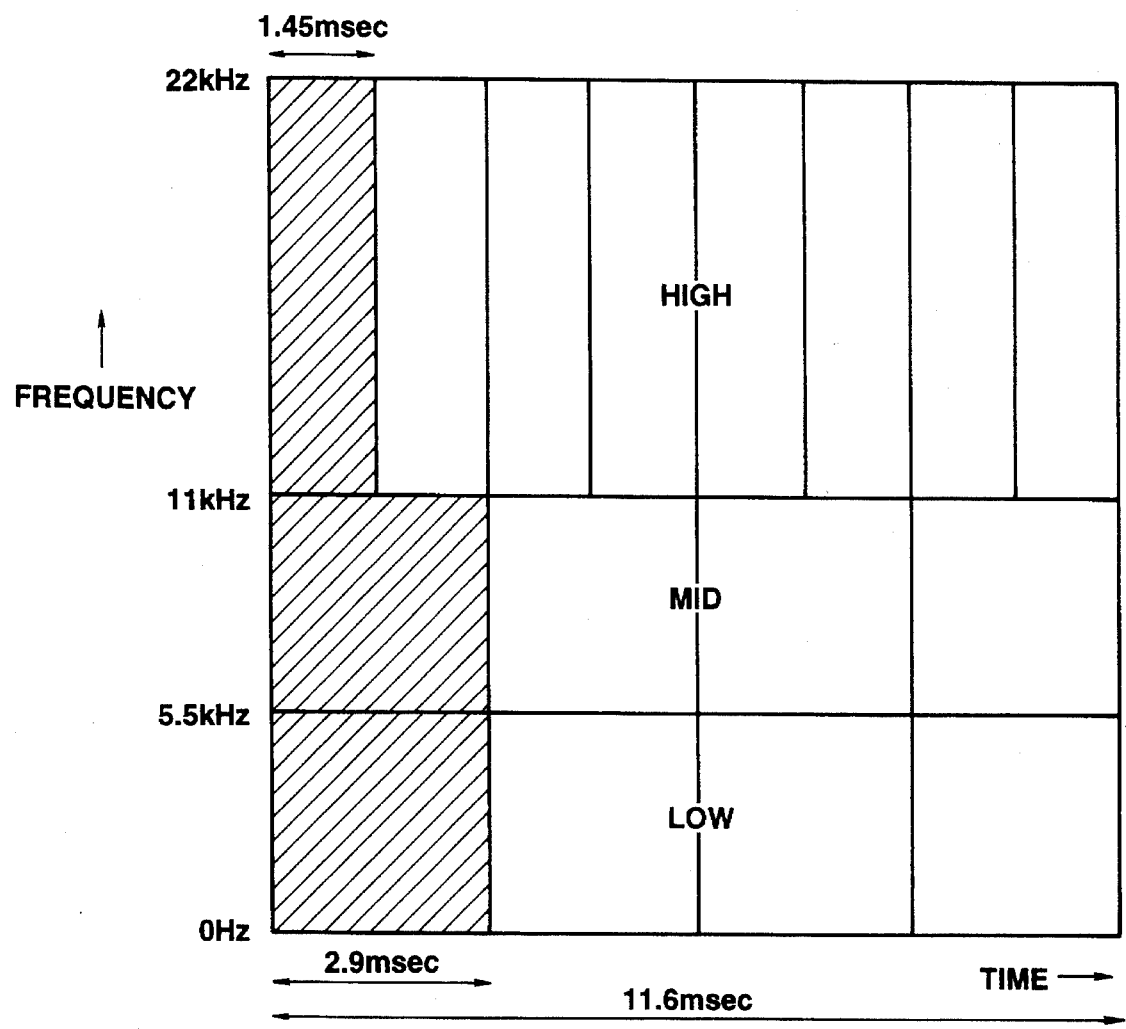
FIG. 3 illustrates a block size for orthogonal transform in the embodiment shown in FIG. 2.

FIG. 3 shows orthogonal transform block sizes for one transform frame. Thus the block size of 11.6 msec (long mode) or the block size of 2.9 msec (short mode) is selected for the low to mid ranges and the block size of 11.6 msec (long mode) or the block size of 1.45 msec (short mode) is selected for the high range. The hatched portions in FIG. 3 represent the block sizes of the short mode.

Returning to FIG. 2, the filter outputs are blocked and orthogonal-transformed by the orthogonal transform circuits 103, 104 and 105 depending on the block size information from the orthogonal transform block size decision circuit 106 for each transform frame so as to be routed to an adaptive bit allocation encoding circuit 108. The orthogonal transform block size information is also routed to the adaptive bit allocation encoding circuit 108. The encoded data from the adaptive bit allocation encoding circuit 108 is outputted at an output terminal 110.

Among the known techniques for orthogonal transform, there is the technique of dividing the input audio signal into frames of a predetermined time duration, and processing the resulting frames using a fast Fourier transform (FFT), discrete cosine transform (DCT) or modified DCT (MDCT) to convert the signals from the time axis into the frequency axis. Discussion of a MDCT may be found in J. P. Princen and A. B. Bradley, Sub-band/Transform Coding Using Filter Bank Based on Time Domain Aliasing Cancellation, ICASSP 1987.

Figure 4:
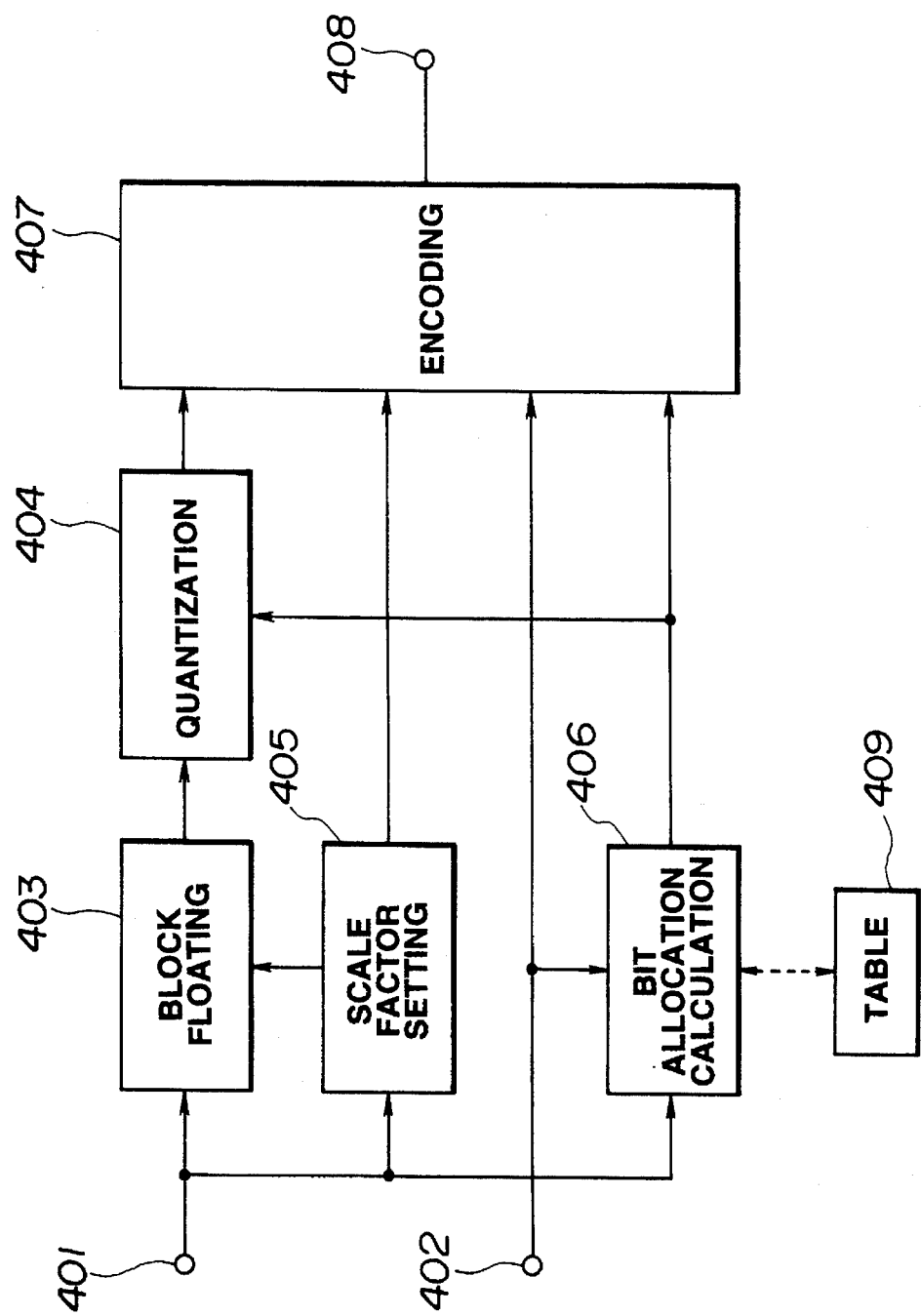
FIG. 4 is a block circuit diagram showing an embodiment of an adaptive bit allocation encoding circuit employed in the embodiment of FIG. 2.

FIG. 4 shows, in a block circuit diagram, a schematic constitution of an illustrative example of the adaptive bit allocation encoding circuit 108 shown in FIG. 1.

In FIG. 4, frequency-domain spectral data from the orthogonal transform circuits 103, 104 and 105 or the MDCT coefficient data are supplied to a terminal 401, while the block size information from the orthogonal transform block size decision circuit 106 is routed to a terminal 402.

The spectral data from the terminal 401 is routed to a block floating circuit 403, a scaling factor setting circuit 405 and to a bit allocation calculating circuit 406.

In the scaling factor setting circuit 405, the floating information for block floating is set in accordance with the spectral data divided in consideration of the critical bands and the block floating. The floating information usually employed is approximately a peak value of the spectral data in each critical band and sub-bands divided from the critical bands in order to take into account the block floating. The floating information thus set is employed as the scaling factor for each critical band and sub-bands divided from the critical bands in order to take into account the block floating.

In the bit allocation calculation circuit 406, the masking quantity for each critical band and sub-bands divided from the critical bands in order to take into account the block floating is found in order to take into account the so-called masking effect based upon the spectral data divided into the critical bands and for taking the block floating into account. The number of bits allocated to the respective bands are found on the basis of the masking quantity thus found and the energy or peak values of each critical band and sub-bands divided from the critical bands in order to take into account the block floating.

Since there is a limit to the number of available bits, it is necessary to adjust the number of allocated bits at the same time as the total number of bit required for encoding is calculated so that the number of bits required for encoding will not exceed the total number of available bits. Reference is had to a table memory 409 for calculating the number of bits required for encoding. The processing in the bit allocation circuit 406 will be explained subsequently.

The block floating circuit 403 processes the spectral data with block floating for each critical band and sub-bands divided from the critical bands in order to take into account the block floating on the basis of the scaling factor (floating information) as set by the scaling factor setting circuit 403.

In the quantization circuit 404, the respective spectral data are re-quantized depending on the scaling factors as set by the scaling factor setting circuit 405 and the number of bits allocated for the bands by the bit allocation calculation circuit 406.

The quantized spectral data outputted by the quantization circuit 404, the scaling factor data outputted by the scaling factor setting circuit 405, the information on the allocated bit numbers outputted by the bit allocation calculation circuit 406 and the orthogonal transform block size information supplied from the terminal 402, are routed to an encoding circuit 407 so as to be encoded in accordance with a variable length coding system and outputted at an output terminal 408.

The processing by the bit allocation circuit 406 is now explained.

Figure 5:
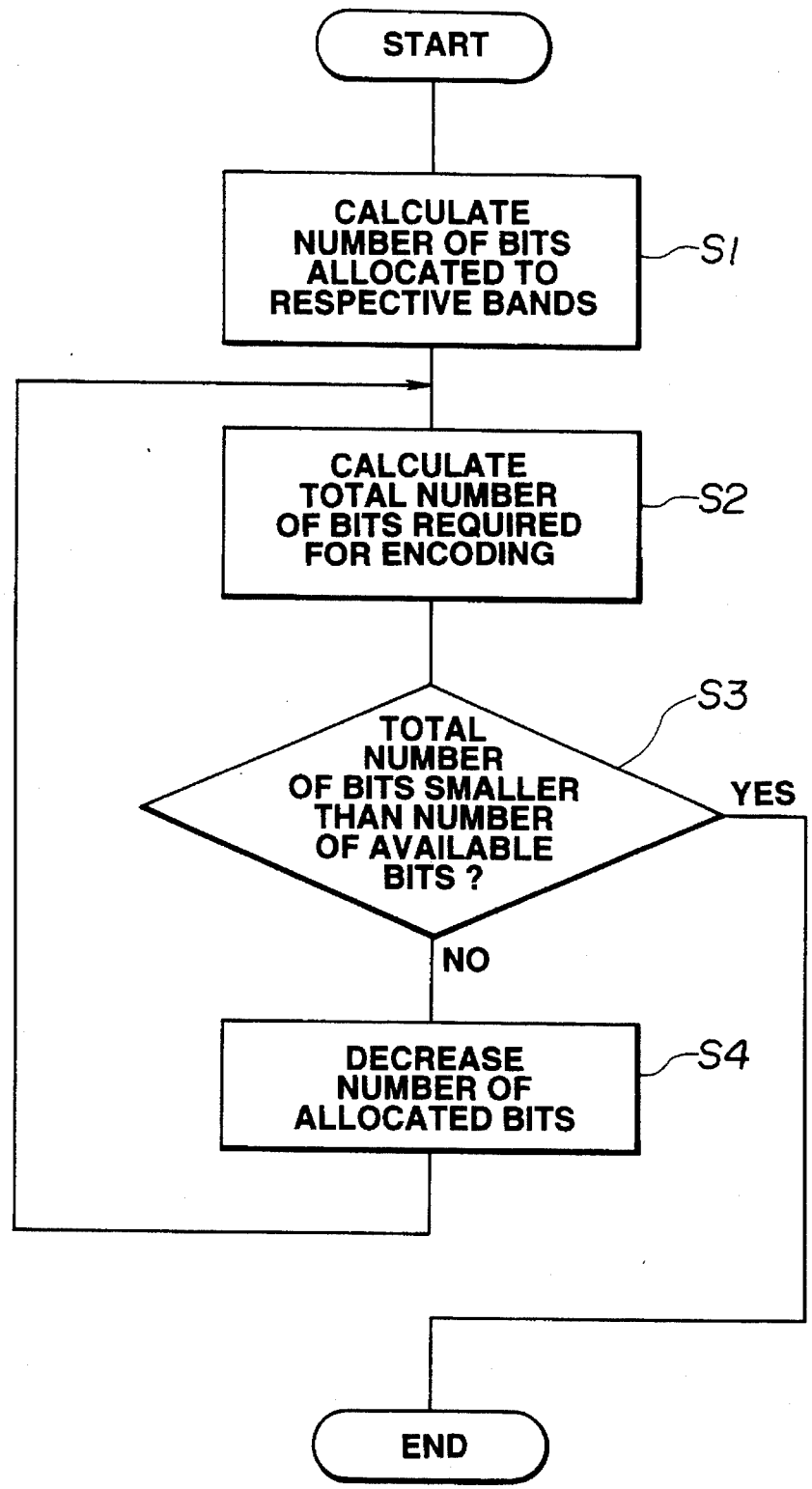
FIG. 5 is a flow chart for illustrating the processing executed by a bit allocation circuit shown in FIG. 4.

FIG. 5 shows, in a flow chart, the processing steps at the bit allocation circuit 406.

Referring to FIG. 5, the numbers of bits allocated to the respective bands are calculated at step S1. At the next step S2, the number of bits required for quantizing and encoding in accordance with the numbers of allocated bits is calculated.

At the next step S3, the total number of bits for encoding is compared to the pre-set number of available bits. If the total number of bits required for encoding is smaller, the processing comes to a close. If the total number of bits required for encoding is larger, code overflow occurs, so that the number of allocated bit is decreased at step S4, after which the program reverts to step S2 in order to calculate the total number of bits required for encoding. The above processing is repeated until the calculated total number of bits becomes less than the pre-set total number of bits.

Figure 6:
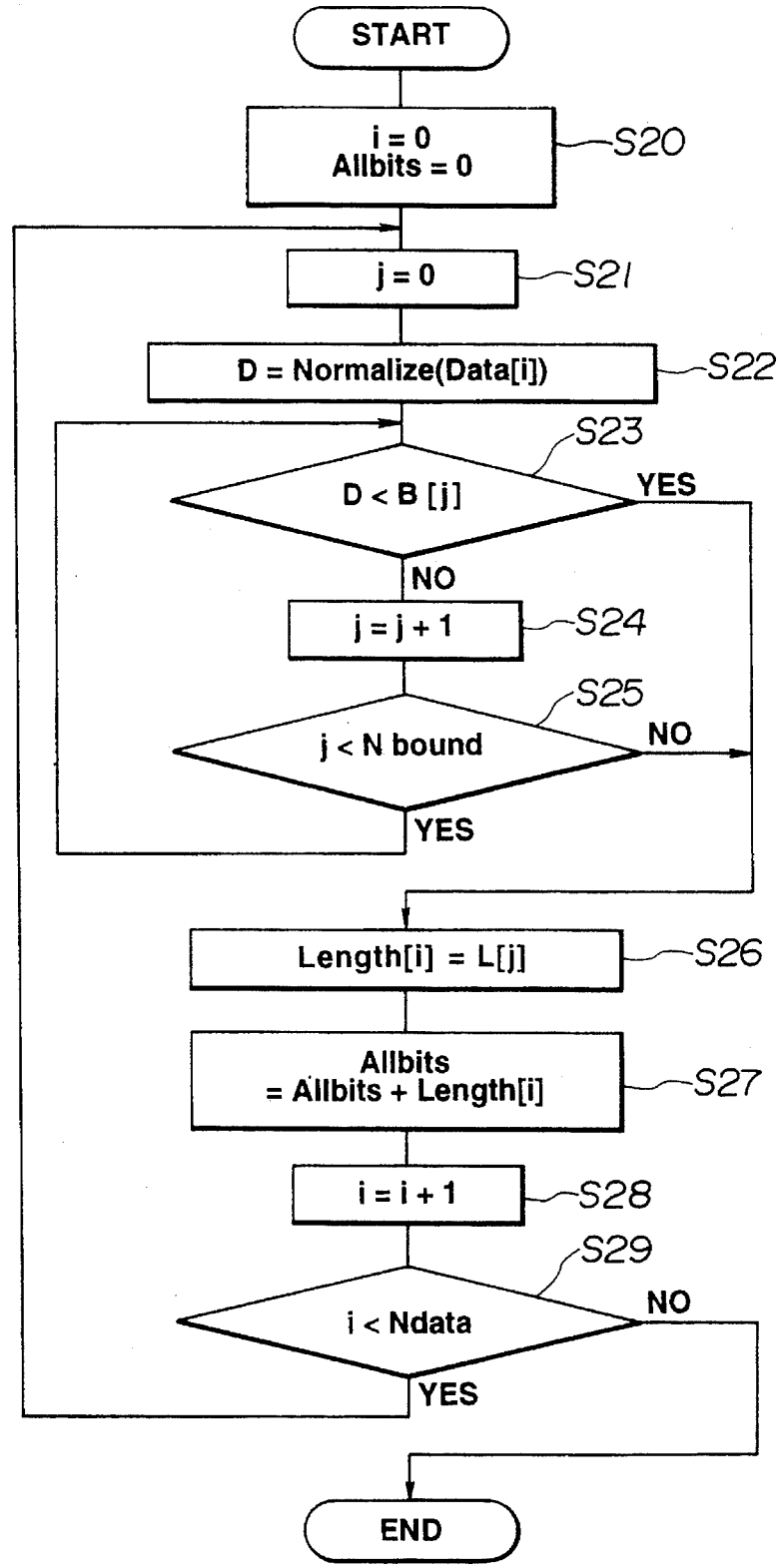
FIG. 6 is a flow chart for illustrating an illustrative example of calculation of the total number of bits required for encoding at a step S2 of FIG. 5.

In FIG. 6, there is shown a flow chart for calculating the total number of bits required for encoding data in accordance with the variable length encoding system, as an illustrative example of processing contents at step S2 of FIG. 5.

Figure 8:
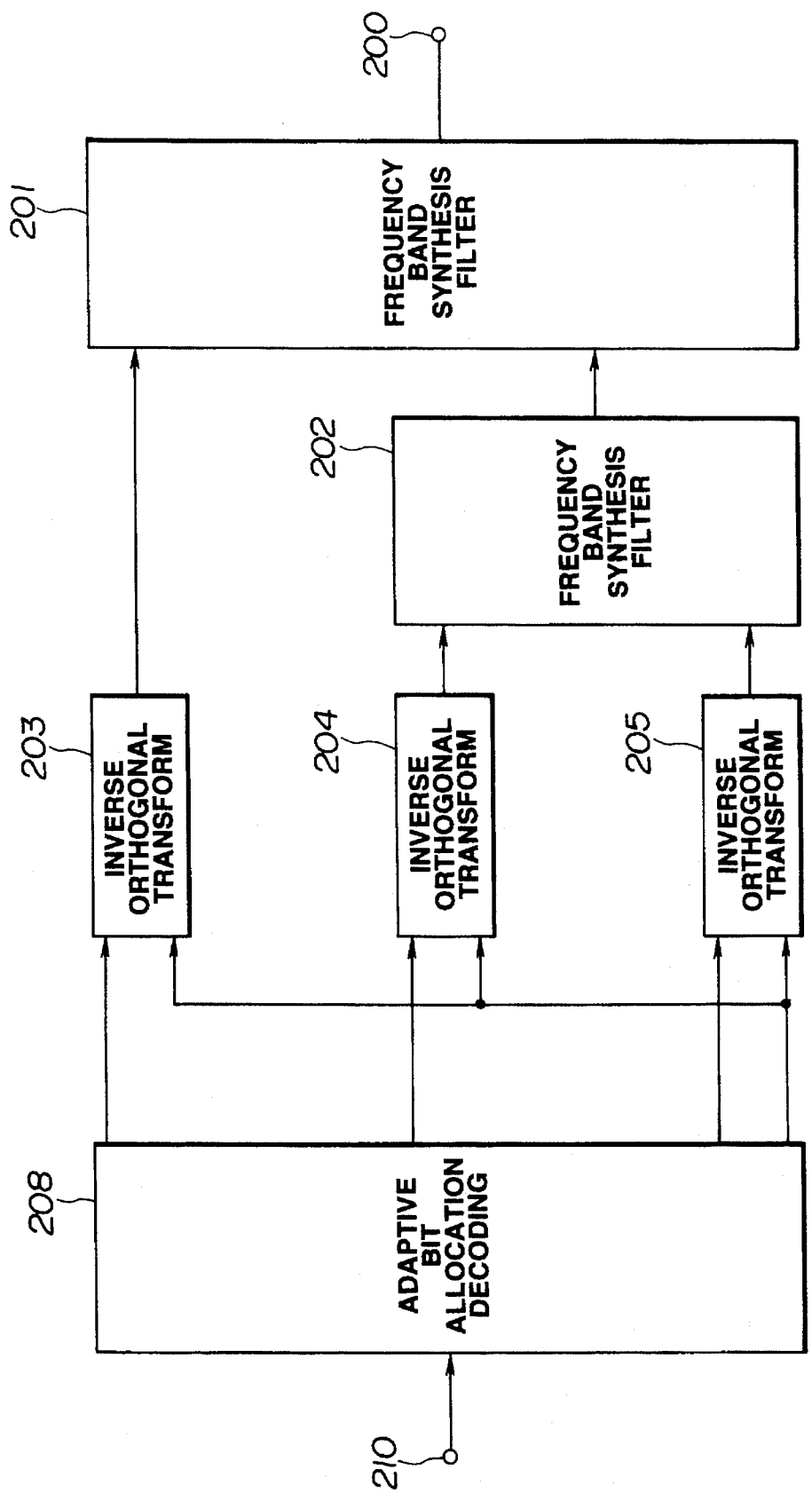
FIG. 8 is a block circuit diagram for illustrating an embodiment of a decoding device for decoding the data encoded by the encoding device shown in FIG. 2.

In FIG. 8, the number of bits Allbits required for encoding the input data string Data[1] made up of Ndata input data. The spectral data or the MDCT coefficient data become the input data string Data[1].

At steps S20 and S21, the variables for arithmetic-logical operations are initialized. That is, at step S20, the loop control variable i and the variable Allbits indicating the total number of bits are both set to 0. At step S21, the variable i is set to zero.

At the next step S22, the input data string Data[i] is normalized in accordance with pre-set normalization coefficients, in order to calculate normalized data D. The scaling factors are employed as the normalizing coefficients.

At the next step S23, the normalized data D is compared to B[j] as later explained. If D is smaller than B[j], the program shifts to step S28 where Length[i]=L[j] is set. That is, L[j] as later explained is employed as the number of bits Length[i] required for encoding Data[i]. Discussion on B[j] and L[j] will be made subsequently.

If the result of decision at step S23 is NO, that is if D is larger than or equal to B[j], the program shifts to step S24 to increment j. At the next step S25, it is judged whether j is smaller than Nbound. Decision at step S23 is repeated until j reaches Nbound. That is, the above process steps are repeated until the relation D<B[j] is met.

At the next step S27, Length[i] is added to Allbits to calculate the total number of bits required for encoding.

At the next step S28, i is incremented. At step S29, it is judged whether i is smaller than Ndata and, if the result is YES, the program reverts to step S21, in order to repeat the above process steps a number of times equal to the number of data (Ndata).

Turning to B[j] and L[j], B[j] represents the boundary values on D for which the variable length code transition takes place. The code length transition does not take place if D is within a range of B[j−1] to B[j]. That is, the input data D has the same code length within such range. The code length at this time is L[j]. If D is within a range of from B[j−1] to B[j], the input data Data[i] is encoded with a code having a length L[j].

For illustrating an example of the method for determining B[j], illustrative examples of an encoding table employed for variable length encoding in the encoding circuit 407 of FIG. 4 is shown in Table 1, while an illustrative example of the contents of a table memory 409 employed for calculating the number of bits required for encoding in the bit allocation calculating circuit is shown in Table 2.

TABLE 1

| k | QBound[k] | Quant[k] | Code[k] | CodeLen[k] |
|---|---|---|---|---|
| | | Nstep = 11 | | |
| 0 | −0.818 | −5 | 11111 | 5 |
| 1 | −0.636 | −4 | 11101 | 5 |
| 2 | −0.455 | −3 | 1101 | 4 |
| 3 | −0.273 | −2 | 1011 | 4 |
| 4 | −0.091 | −1 | 1001 | 4 |
| 5 | 0.091 | 0 | 0 | 1 |
| 6 | 0.273 | 1 | 1000 | 4 |
| 7 | 0.455 | 2 | 1010 | 4 |

TABLE 1-continued

| | | Nstep = 11 | | |
|---|---|---|---|---|
| k | QBound[k] | Quant[k] | Code[k] | CodeLen[k] |
| 8 | 0.636 | 3 | 1100 | 4 |
| 9 | 0.818 | 4 | 11100 | 5 |
| 10 | 1.000 | 5 | 11110 | 5 |

TABLE 2

| | Nbound = 5 | |
|---|---|---|
| j | B[j] | L[j] |
| 0 | −0.636 | 5 |
| 1 | −0.091 | 4 |
| 2 | 0.091 | 1 |
| 3 | 0.636 | 4 |
| 4 | 1.000 | 5 |

Table 1 shows an example of variable length encoding for the number of quantization steps Nstep at the time of quantization of the input data equal to 11.

In Table 1, QBound[k] denotes the boundary values of quantization. If the normalized data value is in a range of from QBound[k−1] to QBound[k], quantization is made at Quant[k] which depends on a particular quantizer employed. Code[k] is a code obtained on variable length encoding the quantization value Quant[k]. CodeLen[k] denotes the code length of Code[k]. In effect, Code[k] is recorded or transmitted by a length equal to CodeLen[k].

Based on Table 1, the point of transition of CodeLen[k], that is the point at which the value of CodeLen[k] differs from the value of the next CodeLen[k+1], is found in order to determine the boundary value B[j] and the code length L[j]. In the illustrative example, there are five regions, with such number of regions being Nbound mentioned above.

This Table 2 is written in the table memory 409 of FIG. 4 and is employed for calculating the number of bits for encoding by the bit allocation calculating circuit 406. Thus the number of bits required for encoding can be easily calculated by carrying out the steps S23 to S26 of FIG. 6 based on Table 2 without the necessity of carrying out the quantization and encoding of each data based on Table 1.

Figure 7:
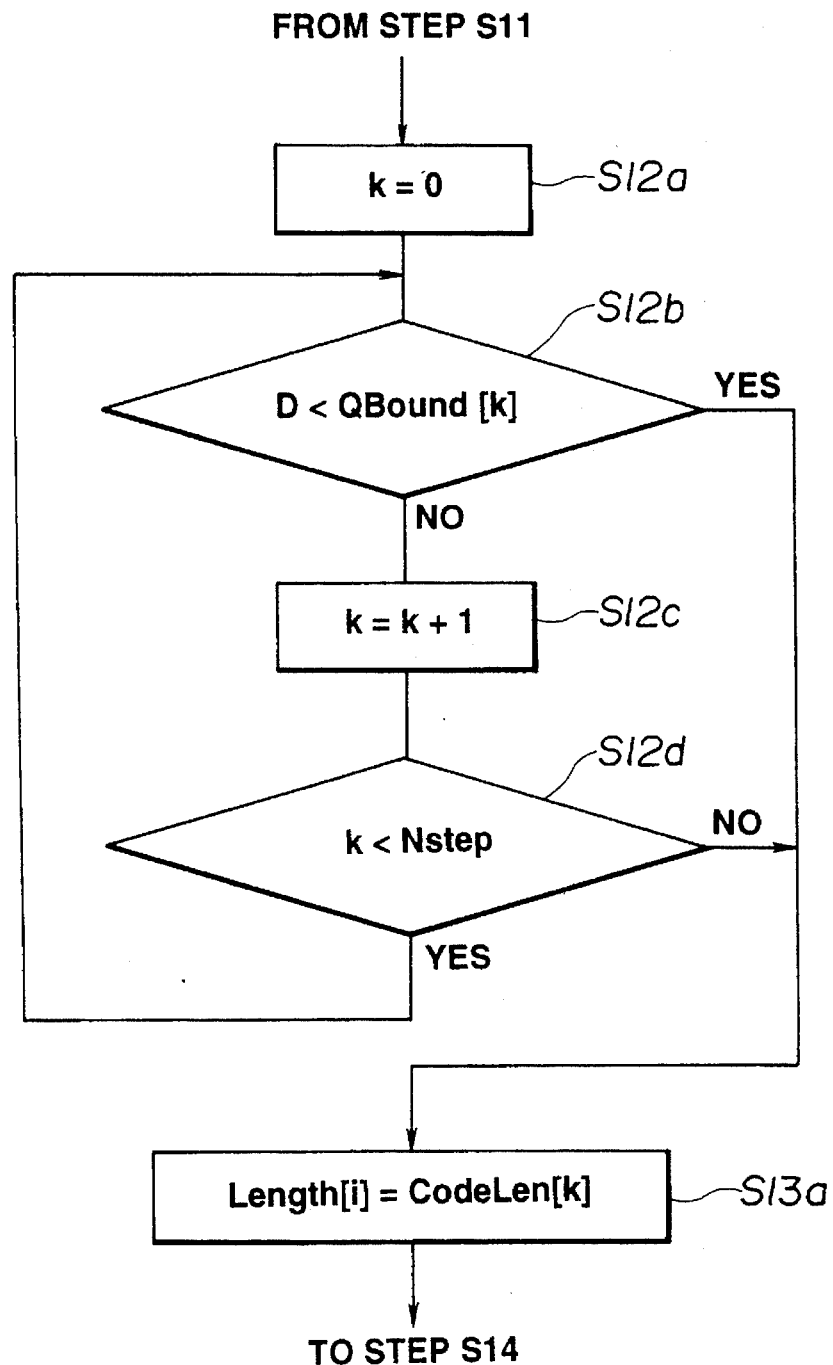
FIG. 7 is a flow chart for illustrating part of the process for calculating the total number of bits for variable length encoding according to the conventional system.

For comparison, the operation of calculating the number of bits required for encoding in the conventional practice employing Table 1 is explained by referring to FIG. 7.

In this figure, there is shown a processing corresponding to steps S12 and S13 of FIG. 1. The step S11 of FIG. 1 is followed by a step S12a of FIG. 7, and a step S13a of FIG. 7 is followed by a step S14 of FIG. 1.

That is, the variable k is initialized to 0 at step S12a of FIG. 7. Then it is judged at step S12 whether or not the input data D is smaller than the boundary value QBound[k] for quantization. If the result is YES, k is a value corresponding to the quantization value. The program shifts to step S13a where Length[i]=CodeLen[k] is set. That is, CodeLen[k] in Table 1 is employed as the number of bits length[i] required for encoding the input data Data[i].

If the result of judgment at step S12b is NO, the program shifts to step S12c to increment the variable k. At the next step S12d, it is determined if k is smaller than the number of quantization steps Nstep. The decision at step S12b is repeated until k reaches Nstep. Thus the processing is continued until the relation D<QBound[k] is met.

With the above-described conventional method, the process steps need to be repeated a number of times equal to a maximum value of Nstep in order to find the number of bits required for encoding. If the number of quantization steps Nstep assumes a value of 63 or more, the maximum number of times of repetition is significantly increased. In addition, the number of data Ndata is as large as e.g., 512. Furthermore, if the total number of bits is larger than the number of available bits, the number of allocated bits needs to be decreased in order to calculate the number of bits required for encoding. Since the processing steps can be repeated over an unpredictable number of times, the volume of the arithmetic-logical operations becomes voluminous.

On the contrary, with the embodiment illustrated, the domain is divided into plural regions at boundary values corresponding to changes in the coding lengths, and the number of bits required for encoding is calculated on the region basis, so that the number of repetition is limited to the number of the regions Nbound at the maximum, thereby diminishing the volume of the arithmetic-logical operations. This leads not only to the merit of expediting the processing at the bit allocation calculation circuit 406 but to the merit of enabling real-time processing even with the use of an inexpensive constant-rate processing IC.

Figure 9:
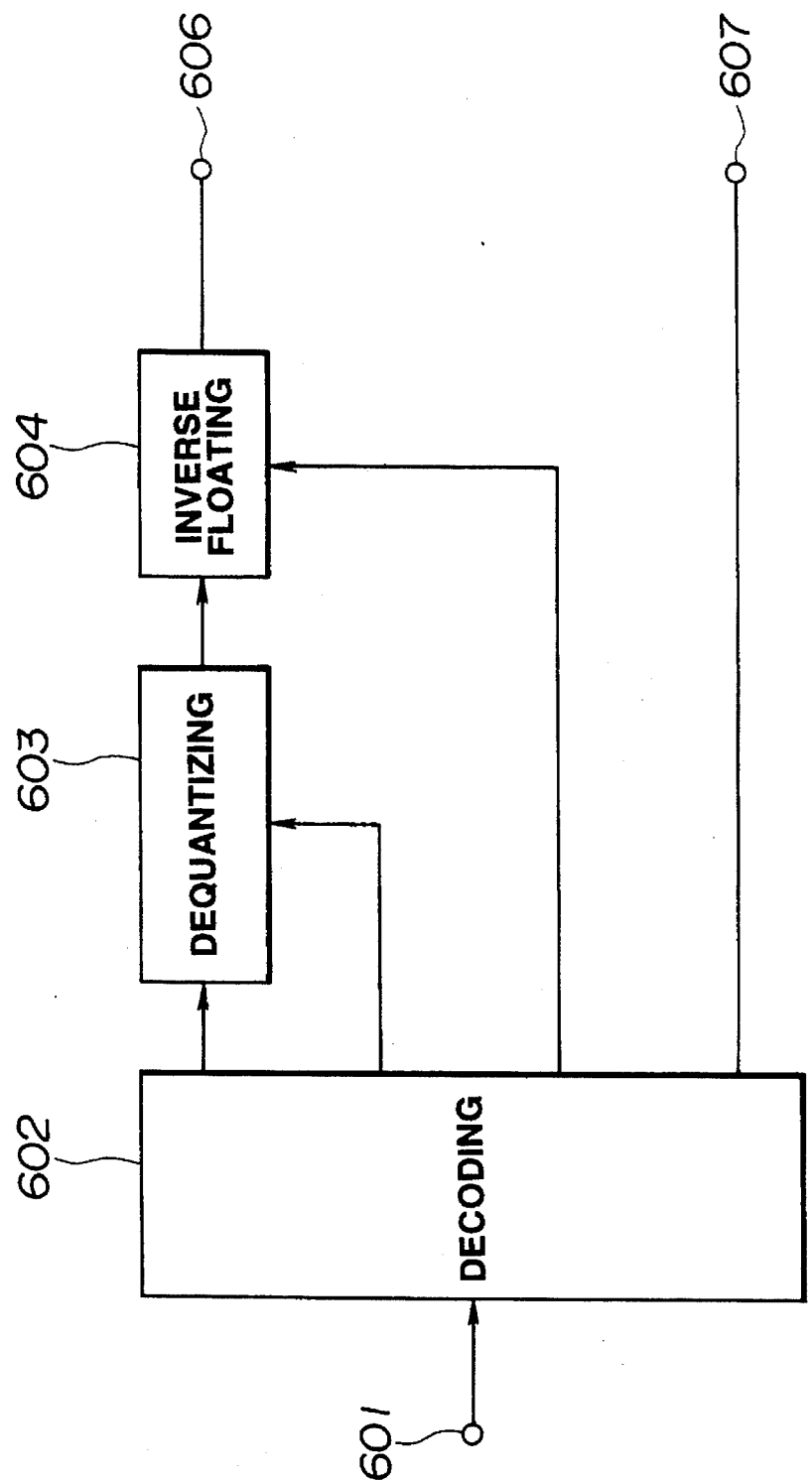
FIG. 9 is a block circuit diagram showing an embodiment of an adaptive bit allocation decoding circuit in the decoding device shown in FIG. 8.

Referring to FIGS. 8 and 9, an example of a decoding apparatus for decoding data encoded by a high efficiency encoding device explained in conjunction with FIGS. 1 to 4.

In FIG. 8, showing a schematic constitution of the decoding apparatus, encoded data from the output terminal 110 of FIG. 2, encoded in accordance with the variable length encoding system, is supplied to an input terminal 210. The encoded data is routed to an adaptive bit allocation decoding circuit 208 for decoding so as to be restored to spectral data on the frequency axis. The orthogonal transform block size information is taken out by the decoding operation and transmitted to inverse orthogonal transform circuits 203, 204 and 205 for respective bands along with the spectral data on the frequency axis.

In FIG. 9, there is shown in a block diagram a schematic constitution of an illustrative example of the adaptive bit allocation decoding circuit 208 shown in FIG. 8. The encoded data routed to a terminal 601 of FIG. 9 is decoded by the decoding circuit 602 in accordance with the variable length decoding system so as to be restored to the spectral data information on the frequency axis, scaling factor information, allocated bit number information and the orthogonal bit number information. The orthogonal bit number information is outputted at an output terminal 607. The spectral data information and the bit allocation number information are routed to an inverse quantization circuit. The spectral data information is inverse quantized based on the allocated bit number information. The inverse quantized spectral data information from the inverse quantization circuit 603 and the scaling factor information from the decoding circuit 602 are fed to the inverse floating circuit 604. The spectral data information is processed with inverse floating based on the scaling factors for restoration to spectral data so as to be outputted at an output terminal 606.

Returning to FIG. 8, data in the bandwidth of 0 to 5.5 kHz, data in the bandwidth of 5.5 to 11 kHz and data in the bandwidth of 11 to 22 kHz, among the spectral data from the adaptive bit allocation decoding circuit 208, are routed to the inverse orthogonal transform circuits 203, 204 and 205, respectively, so as to be inverse orthogonal-transformed on the band basis in accordance with the orthogonal transform block size information.

Outputs of the inverse orthogonal transform circuits 204, 205 are synthesized by a band synthesis circuit 202. Outputs of the inverse orthogonal transform circuit 203 and the band synthesis filter 202 are synthesized by the band synthesis filter to generate a playback signal which is outputted at an output terminal 200.

The quantizer employed in the above-described embodiment is the most commonplace quantizer. If a quantizer with positive-negative symmetry is employed, the volume of the arithmetic-logical operations may be diminished as compared to that achieved with the conventional system if the code lengths for the quantized values also exhibit positive-negative sign symmetry, that is, if the absolute values of two quantized values having positive and negative signs are the same, these quantized values are of the same code length. Table 3 shows an illustrative example of the code table in case of performing variable length encoding with positive-negative symmetry on the quantized values having positive-negative sign symmetry.

TABLE 3

| | Nstep = 6 | | | |
|---|---|---|---|---|
| k | |QBound[k]| | |Quant[k]| | Code[k] | CodeLen[k] |
| 0 | 0.091 | 0 | 0 | 1 |
| 1 | 0.273 | 1 | 1000 | 4 |
| | | | 1001 | 4 |
| 2 | 0.455 | 2 | 1010 | 4 |
| | | | 1011 | 4 |
| 3 | 0.636 | 3 | 1100 | 4 |
| | | | 1101 | 4 |
| 4 | 0.818 | 4 | 11100 | 5 |
| | | | 11101 | 5 |
| 5 | 1.000 | 5 | 11110 | 5 |
| | | | 11111 | 5 |

By representing QBound[k] and Quant[k] by corresponding absolute values |QBound[k]| and |Quant[k]|, the number of quantization steps Nstep may be diminished from 11 of Table 1 to 6 of Table 3, thereby correspondingly diminishing the volume of the arithmetic-logical operations.

In addition, by dividing the domain of the quantized values at the boundaries of transition of the code length CodeLen[k], that is at the positions indicated by broken lines of Table 3, it becomes possible to obtain a table for calculating the number of bits for encoding, as shown in Table 4.

TABLE 4

| | Nbound = 3 | |
|---|---|---|
| j | B[J] | L[j] |
| 0 | 0.091 | 1 |
| 1 | 0.636 | 4 |
| 2 | 1.000 | 5 |

In Table 4, the number of the boundary values B[j], corresponding to transitions of the code length of Table 3, is equal to 3. That is, the number of regions becomes three (Nbound=3). By such variable length encoding with symmetry for positive-negative signs, that is variable length encoding in which the same code length is used for the same absolute value of quantized values different in sign, the number of transitions of the code length may be decreased, as shown in Table 4. That is, the smaller the number of the boundaries, the easier becomes the arithmetic-logical operations for finding the total number of bits, so that the number of values to be pre-set, namely B[j] and L[j], may be decreased.

Figure 10:
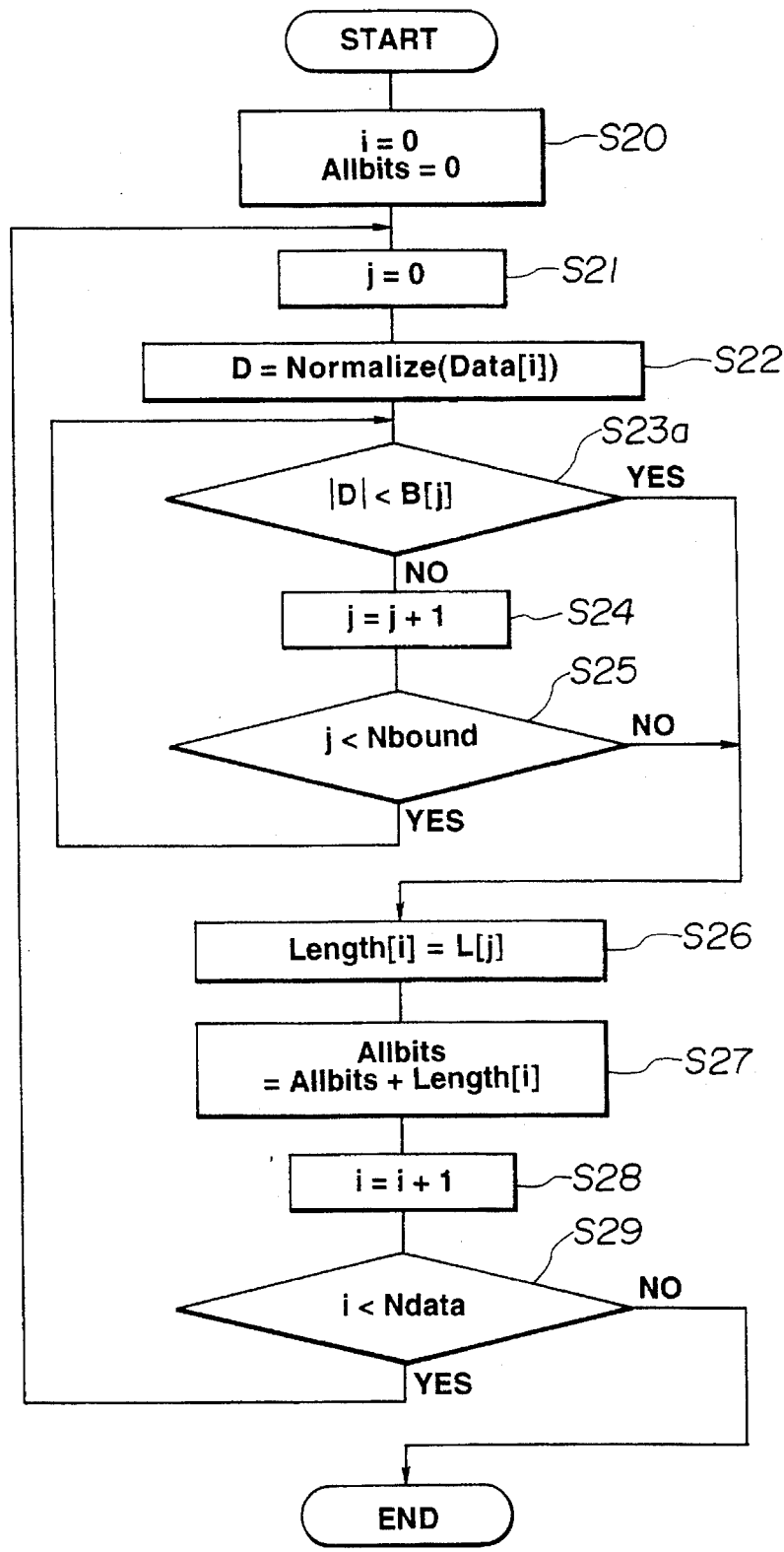
FIG. 10 is a flow chart for illustrating the process of calculating the total number of bits required for variable length encoding according to a modification of the present invention.

An example of the processing operations for calculating the total number of bits for encoding by using Table 4 is shown in the flow chart of FIG. 10.

In this figure, the steps the processing contents of which are the same as those of the steps of the flow chart of FIG. 6 are denoted by the same reference numerals, and the corresponding description is not made.

The example of FIG. 10 differs from the example of FIG. 6 only with respect to step S23a in which the absolute value |D| of the normalized data D is compared to the boundary value B[J] of Table 4 in distinction from the step S23 of FIG. 6. However, the number of regions Nbound at step S25 in FIG. 10 is 3 in place of Nbound=5 in FIG. 6, thus indicating that the volume of arithmetic-logical operations can be diminished further.

Table 5 shows an example of a variable length coding in which the number of boundaries of code length transition is further diminished by further reducing the kinds of the code lengths employed for variable length coding.

TABLE 5

| | NStep = 6 | | | |
|---|---|---|---|---|
| k | |QBound[k]| | |Quant [k]| | Code[k] | CodeLen[k] |
| 0 | 0.091 | 0 | 00 | 2 |
| 1 | 0.273 | 1 | 0110 | 4 |
| | | | 0111 | 4 |
| 2 | 0.455 | 2 | 1000 | 4 |
| | | | 1001 | 4 |
| 3 | 0.636 | 3 | 1010 | 4 |
| | | | 1011 | 4 |
| 4 | 0.818 | 4 | 1100 | 4 |
| | | | 1101 | 4 |
| 5 | 1.000 | 5 | 1110 | 4 |
| | | | 1111 | 4 |

In Table 5, there are only two kinds of code lengths CodeLen[k] of the variable length coding, that is 2 and 4, and the same code length 4 is employed except the code length 2 for the center value 0. The volume of the arithmetic-logical operations may be expected to be diminished by approximately the same value with the use of Table 5 as with the use of Table 3.

In Table 5, the domain may be divided at boundary values corresponding to the points of code length transitions in order to prepare a table for calculating the number of bits for encoding (Table 6).

TABLE 6

| | Nbound = 2 | |
|---|---|---|
| j | B[j] | L[j] |
| 0 | 0.091 | 2 |
| 1 | 1.000 | 4 |

The Table 6 is an example for calculating the number of bits for variable length encoding with the minimum number of transitions. Thus there are only two regions, that is a region centered around the center position 0 and the remaining regions. Thus the volume of the arithmetic-logical operations necessary for calculating the total number of bits required for encoding can be reduced further.

The present invention is not limited to the above-described embodiments, and may be applied not only to processing of audio or PCM signals, but also to processing of digital speech signal or digital video signal. There are also a wide variety of bit allocation techniques, such as the simple fixed bit allocation, bit allocation based on band-based signal energy or the bit allocation consisting in the combination of the fixed bit allocation and variable bit allocation. The orthogonal transform block size is not limited to the above example and may for example be 23.2 msec along the time axis. The signal frequency spectrum may also be divided into four bands and may be optionally set to 22.05 kHz or 20 kHz.

What is claimed is:

1. A method of determining a total data string code length resulting from a selected variable-length encoding corresponding to a number of allocated bits of an input data string having a plurality of normalized high-precision input words, wherein the variable-length encoding translates each normalized high-precision input word into a code having a code length selected from among a plurality of code lengths, wherein the plurality of code lengths correspond to a plurality of ranges of normalized high-precision input word values, wherein the plurality of ranges are separated by a corresponding plurality of boundary values, the method comprising the steps of:

(a) testing whether a next sequential normalized high-precision input word is less than a lowest boundary value not previously tested against the normalized high-precision input word by retrieving the lowest boundary value not previously tested against the normalized high-precision input word from a table memory circuit which stores the boundary values and corresponding code lengths for all quantization and variable-length encodings corresponding to all different numbers of allocated bits, wherein at least one of the plurality of ranges of the selected variable-length encoding corresponds to a plurality of different codes;

(b) returning to step (a), if step (a) determined that the high-precision input word was less than the boundary value, whereby, upon returning to step (a), the lowest boundary value not previously tested against the normalized high-precision input word will be greater than the boundary value already used in step (a);

(c) adding a code length retrieved from the table memory circuit corresponding to the boundary value used in step (a) to a partial data string code length if step (a) determined that the normalized high-precision input word was not less than the boundary value;

(d) determining whether the input data string has been entirely processed by testing whether all of the plurality of high-precision input words have been tested by step (a);

(e) returning to step (a) if step (d) determined that the input data string has not been entirely processed, whereby, upon returning to step (a), the next sequential normalized high-precision input word will be a normalized high-precision input word subsequent to the normalized high-precision input word previously used in step (a); and (f) outputting the partial data string code length as the total data string code length if step (d) determined that the input data string has been entirely processed.

2. A method as in claim 1, further comprising the steps of:

(g) comparing the total data string code length to a pre-set number of available bits; and (h) decreasing the number of allocated bits, thereby changing the selected variable-length encoding and returning to step (a) if step (g) determined that the total data string code length is greater than the pre-set number of available bits.

3. A method as in claim 1, wherein the variable-length encoding is symmetric about a mean with respect to code length, such that for all difference magnitudes, both words differing from the mean by the difference magnitude are translated into equal code lengths.

4. A method as in claim 3, wherein each normalized high-precision input word is either negative, zero, or positive;

wherein the mean is zero, such that the variable-length encoding is symmetric about zero with respect to code length, such that for all word magnitudes both a positive magnitude word and a negative magnitude word are translated into equal code lengths;

wherein the table memory circuit stores code length translations only for positive boundary values; and wherein step (a) includes testing an absolute value of the next sequential normalized high-precision input word against a code length translation retrieved from the table memory circuit.

5. A method as in claim 2, wherein the variable-length encoding is adaptive transform encoding using adaptive bit allocation; and wherein step (h) is performed by variably decreasing the number of allocated bits as a function of a difference computed in step (g) between the total data string code length and the pre-set number of available bits.

6. A method as in claim 1, wherein the input data string having a plurality of normalized high-precision input words is created using the steps of:

dividing an input digital signal into plural frequency band components using plural frequency spectrum dividing filters; and orthogonally transforming the plural frequency band components to produce plural input data strings.

7. An apparatus for determining a total data string code length resulting from a selected variable-length encoding corresponding to a number of allocated bits of an input data string having a plurality of normalized high-precision input words, wherein the variable-length encoding translates each normalized high-precision input word into a code having a code length selected from among a plurality of code lengths, wherein the plurality of code lengths correspond to a plurality of ranges of normalized high-precision input word values, wherein the plurality of ranges are separated by a corresponding plurality of boundary values, the apparatus comprising:

a table memory circuit which stores the boundary values and corresponding code lengths for all variable-length encodings corresponding to all different numbers of allocated bits, wherein at least one of the plurality of ranges of the selected variable-length encoding corresponds to a plurality of different codes;

a comparator for testing whether a next sequential normalized high-precision input word is less than a lowest boundary value not previously tested against the normalized high-precision input word by retrieving the lowest boundary value not previously tested against the normalized high-precision input word from the table memory circuits;

a boundary control circuit for controlling the table memory circuit and the comparator such that a corresponding code length for the high-precision input word is output by the table memory circuit;

an adder for adding the code length output by the table memory circuit to a partial data string code length if the comparator determined that the normalized high-precision input word was not less than the boundary value;

a partial data string register for storing the partial data string code length and for outputting the total data string code length; and a string control circuit for determining whether the input data string has been entirely processed that enables the apparatus.

8. An apparatus as in claim 7, wherein the variable-length encoding is symmetric about a mean with respect to code length, such that for all difference magnitudes, both words differing from the mean by the difference magnitude are translated into equal code lengths.

9. An apparatus as in claim 8, further being limited wherein each normalized high-precision input word is either negative, zero, or positive;

wherein the mean is zero, such that the variable-length encoding is symmetric about zero with respect to code length, such that for all word magnitudes both a positive magnitude word and a negative magnitude word are translated into equal code lengths;

wherein the table memory circuit stores code length translations only for positive boundary values; and wherein the comparator tests an absolute value of the next sequential normalized high-precision input word against a code length translation retrieved from the table memory circuit, the apparatus further comprising:

a quantizer which stores quantization values corresponding to the boundary values, wherein the quantizer is symmetric about zero with respect to quantization value, such that for all magnitudes, both words having each magnitude are translated into quantization values having equal magnitude, wherein the quantizer stores quantization values only for positive boundary values; and a variable-length encoder which stores codes corresponding to the boundary values, wherein two codes correspond to each boundary value which differ by only one bit indicating a sign of the normalized high-precision input word.

10. A method of performing variable-length encoding on an input data string having a plurality of normalized high-precision input words wherein the variable-length encoding is symmetric about a mean with respect to code length, such that for all difference magnitudes, both words differing from the mean by the difference magnitude are translated into equal code lengths, wherein each normalized high-precision input word is either negative, zero, or positive, wherein the mean is zero, such that the variable-length encoding is a symmetric about zero with respect to code length, such that for all word magnitudes both a positive magnitude word and a negative magnitude word are translated into equal code lengths, the method comprising the steps of:

(a) testing whether an absolute value of a next sequential normalized high-precision input word is less than a lowest boundary value not previously tested against the absolute value of the normalized high-precision input word by retrieving the lowest boundary value not previously tested against the absolute value of normalized high-precision input word from a table memory circuit which stores the boundary values and corresponding code lengths for all quantization and variable-length encodings corresponding to all different numbers of allocated bits, wherein at least one of the plurality of ranges of the selected variable-length encoding corresponds to a plurality of different codes, wherein the table memory circuit stores code length translations only for positive boundary values;

(b) returning to step (a), if step (a) determined that the high-precision input word was less than the boundary value, whereby, upon returning to step (a), the lowest boundary value not previously tested against the normalized high-precision input word will be greater than the boundary value already used in step (a);

(c) adding a code length retrieved from the table memory circuit corresponding to the boundary value used in step (a) to a partial data string code length if step (a) determined that the normalized high-precision input word was not less than the boundary value;

(d) determining whether the input data string has been entirely processed by testing whether all of the plurality of high-precision input words have been tested by step (a);

(e) returning to step (a) if step (d) determined that the input data string has not been entirely processed, whereby, upon returning to step (a), the next sequential normalized high-precision input word will be a normalized high-precision input word subsequent to the normalized high-precision input word previously used in step (a);

(f) outputting the partial data string code length as the total data string code length if step (d) determined that the input data string has been entirely processed;

(g) comparing the total data string code length to a pre-set number of available bits;

(h) decreasing the number of allocated bits, thereby changing the selected variable-length encoding and returning to step (a) if step (g) determined that the total data string code length is greater than the pre-set number of available bits;

(i) quantizing the input data string having a plurality of normalized high-precision input words to produce a quantized string using a quantizer which stores quantization values corresponding to the boundary values, wherein the quantizer is symmetric about zero with respect to quantization value, such that for all magnitudes, both words having each magnitude are translated into quantization values having equal magnitudes, wherein the quantizer stores quantization values only for positive boundary values; and (j) variable-length encoding the quantized string using a variable-length encoder which stores codes corresponding to the boundary values, wherein two codes correspond to each boundary value which differ by only one bit indicating a sign of the normalized high-precision input word.

11. An apparatus for performing variable-length encoding on an input data string having a plurality of normalized high-precision input words wherein the variable-length encoding is symmetric about a mean with respect to code length, such that for all difference magnitudes, both words differing from the mean by the difference magnitude are translated into equal code lengths, wherein each normalized high-precision input word is either negative, zero, or positive, wherein the mean is zero, such that the variable-length encoding is symmetric about zero with respect to code length, such that for all word magnitudes both a positive magnitude word and a negative magnitude word are translated into equal code lengths, the apparatus comprising:

a table memory circuit which stores the boundary values and corresponding code lengths for all variable-length encodings corresponding to all different numbers of allocated bits, wherein at least one of the plurality of ranges of the selected variable-length encoding corresponds to a plurality of different codes, wherein the table memory circuit stores code length translations only for positive boundary values;

a quantizer which stores quantization values corresponding to the boundary values, wherein the quantizer is symmetric about zero with respect to quantization value, such that for all magnitudes, both words having each magnitude are translated into quantization values having equal magnitudes, wherein the quantizer stores quantization values only for positive boundary values; and a variable-length encoder which stores codes corresponding to the boundary values, wherein two codes correspond to each boundary value which differ by only one bit indicating a sign of the normalized high-precision input word.

* * * * *

UNITED STATES PATENT AND TRADEMARK OFFICE
CERTIFICATE OF CORRECTION

PATENT NO. : 5,623,557
DATED : April 22, 1997
INVENTOR(S) : OSAMU SHIMOYOSHI ET AL.

It is certified that error appears in the above-indentified patent and that said Letters Patent is hereby corrected as shown below:

Col. 12, line 63, "circuits" should be --circuit--.

Col. 13, line 55, the word "a" should be deleted.

Signed and Sealed this

Second Day of September, 1997

BRUCE LEHMAN

Attest:

Attesting Officer

Commissioner of Patents and Trademarks